Aug. 1, 1944.　　　S. S. MATTHES　　　2,354,869
TROLLEY WIRE SUPPORT
Filed Sept. 7, 1942
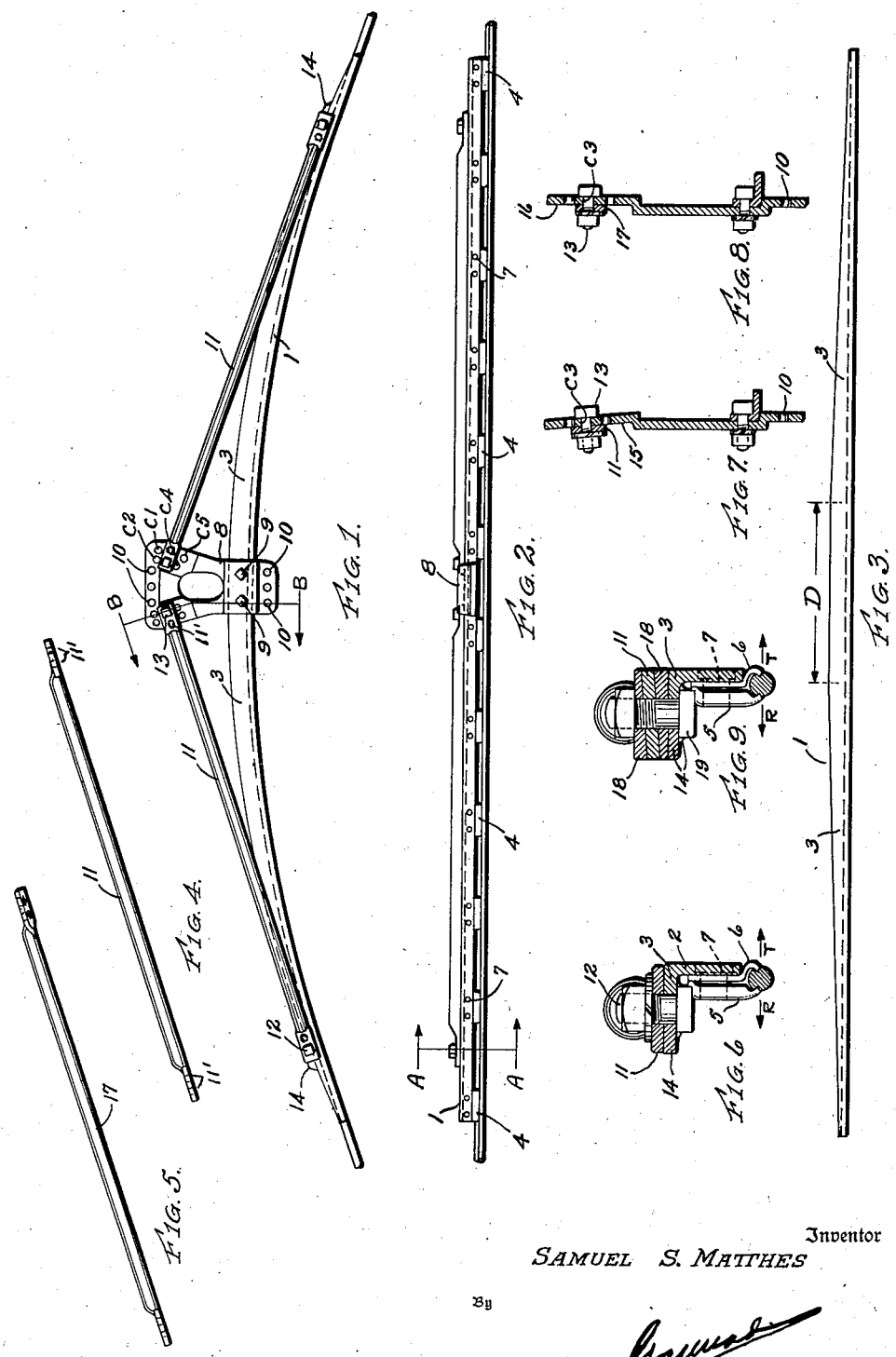
Inventor
SAMUEL S. MATTHES
By
Attorney Patented Aug. 1, 1944

2,354,869

UNITED STATES PATENT OFFICE 2,354,869

TROLLEY WIRE SUPPORT

Samuel S. Matthes, Mansfield, Ohio, assignor to The Ohio Brass Company, Mansfield, Ohio, a corporation of New Jersey Application September 7, 1942, Serial No. 457,621

23 Claims. (Cl. 191—40)

My invention relates to supports for trolley wires and has particular reference to trolley wires at curves in which the wire forms a part of a curve of an overhead system employing two parallel wires for trolley coach operation, as disclosed in my United States Patent 2,287,752, issued June 23, 1942.

My present disclosure is an improvement over my previous inventions based upon actual experience in the design, construction, operation and service of past supports.

My present invention has several objects, namely, to provide a support which is light in weight, which may be formed to a predetermined radius of curvature, which may have its radius of curvature varied, and which may have its radius of curvature maintained under stress of the trolley wire.

Other objects of my invention are to provide a support in which the ends of the curved bar or segment will withstand the pull of the trolley wire without the bar tipping or twisting from its normal vertical position and dewiring the current collector, also in which the bar takes a substantially uniform radius of curvature and will support a continuous trolley wire without the bar straightening and loosening its curvature under stress of the trolley wire.

Other objects will be apparent to those skilled in the art from the description which I am about to give.

My invention resides in the new and useful construction, combination and relation of the parts hereinafter described and shown in the drawing.

In the drawing:

Fig. 1 is a top plan view of my invention suitable for supporting a single trolley wire.

Fig. 2 is a side or edge view of Fig. 1.

Fig. 3 is a top plan view before pre-forming of the elongated bar or segment which I employ.

Fig. 4 is one form of torsion and tension rod or tube which I use.

Fig. 5 is another form of rod or tube which I may use.

Fig. 6 is a part-section on the line A—A of Fig. 2 in which the rod shown in Fig. 4 is employed.

Fig. 7 is a part section on the line B—B of Fig. 1 in which the rod shown in Fig. 4 is used.

Fig. 8 is a part-section on the line B—B when the rod shown in Fig. 5 is used; Fig. 6 shows the other end of the rod 5.

Fig. 9 shows a part-section on the line A—A when the rod shown in Fig. 4 is used with the plate shown in Fig. 8.

As the trolley coach art advances, improvements in the overhead trolley system are found equally necessary. One of the advances in the overhead art is to make the curved segments, used to support the trolley wire at curves, much longer than in the past and to keep the weight down as much as possible.

Also, the use of a continuous trolley wire so supported as to be contacted by the current collector throughout its travel across the curved segment is found better adapted to some conditions than when the trolley wire is severed and the ends are attached to the ends of the bar which acts as a direct guide for the current collector.

The three requirements alone, mentioned above, have brought up new problems which have had to be met. One of the difficulties met with in the first device produced to meet these requirements was a tipping, twisting or canting of the curved bar at or adjacent the ends thereof due to the side pull exerted by the trolley wire and which also has a tendency to straighten out or otherwise change the curvature of the curved segment or bar since it is relatively long and of a light cross-section to keep down the weight.

If the segment or bar is of rectangular cross-section, it is normally disposed with its longitudinal axis parallel to the longitudinal axis of the trolley wire and its leg vertically disposed.

So long as the leg of the bar remains in its normal, vertical position and the proper radius of curvature of the bar is maintained, the current collector is reasonably sure to follow the curve without dewirement.

In order to avoid the twisting of the curved segment or bar, I provide means for opposing the stress component acting normal to the side of the car adjacent its end and at its lower edge which is due to the stress in the trolley wire and which tends to twist the ends of the bar from their normal vertical position.

In the preferred embodiment of my invention, I employ a bar 1, preferably formed to a definite radius of curvature. In actual practice I find, with the features of construction which I employ, that I am able to adjust the curvature of the bar which, for example, has been pre-formed to a radius of 13 feet, to any radius of curvature between the limits of 10 feet and 16 feet.

The bar 1 is longitudinally disposed and is provided with the normally, vertically disposed leg portion 2 of rectangular cross-section with a laterally projecting leg portion 3 which preferably extends for the length of the portion 2.

In order to use a continuous trolley wire, as mentioned above, I provide the bar with a plurality of clamps 4, spaced along the bar as required to grip and support the trolley wire.

The clamps are shown as comprising two members 5 and 6 which are attached to the bar 1 on the convex side and secured to the trolley wire by means of the screws 7. The form of clamps and their association with the bar, as disclosed herein, form the subject matter of my co-pending application, Serial No. 395,375, filed May 27, 1941, now Patent Number 2,304,763, dated December 8, 1942.

In order to support the bar 1, I provide a plate 8 which is secured to the longitudinal center of the bar 1 by the bolts 9 or by other means, as welding. At the ends of the plate are holes 10 or other means to receive supporting means.

The plate 8 is provided with a plurality of spaced openings C, namely, C–1 to C–5, inclusive, spaced from the bar 1 and by means of which I am able to adjust the attachment to the plate of one end of each torsion and tension rod or tube 11.

The other end of each rod 11 is attached to the end portions of the bar 1 that is, at or adjacent the ends of the bar. By shifting the attachment of the ends of the rods 11 to different holes C, the radius of curvature may be altered. As shown in Fig. 1, the rods 11 are attached to the plate 8 by means of the holes C–3 which are the positions for the intermediate predetermined curvature of the bar 1, and by utilizing the holes C–1, C–2, C–4 and C–5 the radius of curvature of the bar is altered. As a matter of convenience and saving in weight of the plate 8, the holes C for each rod are arranged in two rows which permits the use of a shorter plate.

In order to prevent the side component T (Figs. 6 and 7) due to the stress of the trolley wire acting below or at the lower edge of the bar 1, and upsetting the normal vertical position of the bar, I introduce means to oppose such stress component by setting up in the rods 11 a torsional force R tending to counteract the side pull T of the trolley wire.

The rods 11 may be solid or of tubing and of such diameter and of such material as to meet requirements and the ends flattened and provided with one or more openings 11' for the bolts 12 and 13. In order to widen the portion 3 at or adjacent the ends of the bar 1, I weld a piece 14 of sufficient length edgewise to the portion 3 and then form therein a hole or holes for the bolt 12. Should the portion 3 be left full width, the additional portion 14 may not be required.

I prefer to use the rod shown in Figs. 1 and 4 and in order to pre-load the rod which has flattened ends with faces in a common plane, that is, to set up a torsional force therein, I taper or slope the upper surfaces of the plate 8 at 15 to the plane of the upper surface of the bar portion 3 or to the normal plane of the plate as shown in Fig. 7. This tapered surface is formed as a part of the plate 8 which is usually a casting.

It will be evident that when the rods 11 are positioned and the bolts 12 and 13 tightened, as shown in Figs. 6 and 7, that a torsional force is set-up in each rod which tends to twist the ends of the bar 1 in the direction of the arrow R (Fig. 6). The counterforce of the trolley wire is in the direction of the arrow T. Experience will guide one as to the necessary make-up of the rods 11 or plate 8 or both to offset the side pull of the trolley wire.

This pre-loading may be brought about by using a plate, as shown in Fig. 8, in which the surface 16 is in the same plane or parallel plane to the plane of the upper surface of the portion 3 and flattening the rod ends with their faces out of alignment as in the rod 17 of Fig. 5. Here it will be apparent that when the bolts are drawn up tight to bring the end faces of the rod into proper contact with the plate 8 and the bar that a torsional force will be set-up in the rod, the effect being the same as that described above with respect to rod 11.

A further modification of the torsion and tension rod is to employ the rod 11 and the plate of Fig. 8 and modify the attachment of the rod to the bar 1 by employing bevelled washers 18, which will produce a pre-loading of the rod when the bolts 13 and 19 are drawn tight.

The torsion or tension rods may be of solid, square, round, or rectangular cross-section, but I prefer to use tubing as the same amount of metal for a solid rod, when formed into a tube, offers more torsional stress since the metal in the tube is distributed at a greater distance from the neutral axis and hence offers a greater force moment, resisting torsion without increasing the weight.

If the torsion rods are of sufficient size and of proper metal, it is not necessary to pre-load the rods, as they will immediately and sufficiently set-up a torsional force resisting the bending of the ends of the bar 1 from their normal vertical position when the trolley wire stress is applied.

It is well-known by those skilled in the art that in trolley coach operation two parallel trolley wires are used and hence at each curve two devices shown in Fig. 1 will be required; and it is customary to connect the adjacent ends of the plates together by means of insulated spacers, as set forth in my Patent 2,287,752.

The rods 11 act as tension members in that they take the pull of the trolley wires in direct longitudinal alignment therewith at the ends of the bar 1 and, therefore, prevent the bars being straightened out under pull of the trolley wire and the curvature thereof destroyed.

When the bar 1 is of uniform cross-section, there is a tendency for the same to assume a curve other than that of a true circle, that is, the curvature adjacent the plate 8 may take on a shorter radius than the balance of the bar thereby forming a curve approaching more nearly that of a parabola.

The member 3 of the bar 1 may be tapered throughout substantially its entire length, except for a short length D at the center and this will tend to produce a bar having a curve of uniform radius throughout substantially its entire length which is not possible if the bar is of uniform cross-section throughout its entire length. The portion 3 of the bar may be tapered from full width adjacent the longitudinal center to practically zero at the ends.

The rods 11 and 17 and any other rods employed for like purpose are preferably of one-piece, at least there must be no relative movement of the end seating faces of the rods from their normal alignment without setting-up a strong torsional resistance. Tension rods have been employed having means to adjust the length thereof as by turnbuckles and, also, one-piece rods have been used of such small diameter as to offer little, if any, torsional resistance; such rods will not meet the requirements set forth above.

The tension-torsion rods are so attached to the plate and bar that the rods may pivot relative thereto during adjustment of the curvature of the bar. This pivotal movement is necessary in order to permit the adjustment being made without distorting the parts as would be the case if the attachments were permanent.

By having more than one hole in one or both ends of the members 11 and 17 and in the member 14, I am able to secure closer adjustment of the curvature of the bar 1 to that required, as such arrangement especially at the plate 8 end of the rods amounts to what may be termed a vernier adjustment.

Wherever the term rod or member is used in the appended claims, and have reference to the member 11 or 17, they may be of either solid or tubing material.

Wherever the term "longitudinally disposed" is used in the claims it refers to the longitudinal axis of the bar 1 being parallel to or coinciding with the longitudinal axis of the trolley wire. The trolley wire is usually horizontal or substantially so.

My invention is not limited to the use of an angle bar, as shown in the drawings, but may be of any other cross-sectional shape adapted to the purpose required as for instance a T or rectangle.

Having described my invention, I claim:

1. A curved segment to support a trolley wire for a portion of its length at a curve in an overhead system comprising, an elongated flexible body member, a support secured to the body member intermediate the ends thereof and provided with means to attach other supports thereto a plurality of torsion and tension members connected to the body member adjacent the ends thereof and to the support whereby a predetermined curvature of the body member may be maintained and the longitudinal tension of the trolley wire transmitted to the plate member, means associated with the support and the body member and to which the ends of the torsion and tension members are attached whereby a torque is set up in the said tension members when secured in position and which torque is in opposition to the side pull of the trolley wire and means connected to the body member to receive and hold the trolley wire to the body member.

2. A curve assembly for use in an overhead trolley system to support a trolley wire comprising, a strain plate to support the curve assembly in the system, an elongated laterally bendable body member secured to the plate intermediate the ends of the member, means to secure a trolley wire along the lower edge of the body member whereby the contact surface of the wire will be exposed to engagement by a moving current collector, torsion and tension members and non-rotatably connected to the end portions of the body member and attached to the plate in non-rotatable relation to the plate and to the body member to maintain a predetermined degree of curvature of the body member and to set up a torque sufficient to resist the body member twisting out of vertical alignment due to side pull thereon of the trolley wire.

3. A curved segment to support a trolley wire at a curve in an overhead trolley system comprising, an elongated laterally bendable bar of metal, a strain plate to which the bar is attached and provided with means to support the plate, means to secure the trolley wire to the bar, a plurality of tension and torsion members connected to the plate and to the bar adjacent the ends of the bar and in substantially the horizontal plane of the upper edge of the bar, the said members operating to maintain a predetermined curvature of the bar and provided with a torque tending to rotate the ends of the bar in opposition to the side pull of the trolley wire whereby the normally vertical plane of the bar is maintained upright.

4. An overhead curve construction comprising, a trolley wire, an elongated relatively flexible body member having upper and lower longitudinal edges, a supporting plate attached to the body member adjacent the longitudinal center thereof and means to attach supporting means thereto, clamping means for attaching the trolley wire to the body member adjacent its lower edge and hold the trolley wire parallel thereto, a tension and torsion member having a predetermined torque attached to the upper edge of the body member and to the supporting plate to maintain a predetermined degree of curvature in the bar and to transmit the tension of the trolley wire to the supporting plate and to resist the twisting of the ends of the body member about its longitudinal axis due to the side pull of the trolley wire upon the lower edge of the body member.

5. A support for a trolley wire at a curve in an overhead trolley system comprising, an elongated body member, means including tension and torsion members connected to the end portions of the body member to maintain a predetermined curvature in the body member and provided with a preloaded torque to resist the side pull of the trolley wire and to prevent the ends of the body member twisting out of alignment with the central portion of the bar due to said side pull of the trolley wire and means to attach the trolley wire to the body member to provide a smooth path for the current collector.

6. A trolley wire support for use on a curve in an overhead trolley system comprising, an elongated flexible curved bar of metal provided with a vertical leg, means associated with the bar to hold a trolley wire in predetermined relation to the bar, projecting means attached to the bar adjacent the longitudinal center thereof, tension members extending from the bar on opposite sides of the projecting means to the projecting means and attaching means associated with the projecting means to detachably secure the members to the projecting means in different positions thereon whereby the curvature of the bar may be either increased or decreased without changing the length of the members and the curvature maintained after adjustment thereof, the said members being so constructed and arranged relative to the bar and to the projecting means as to exert a predetermined torque upon the ends of the bar constantly resisting the side pull of the trolley wire upon the ends of the bar thereby maintaining the vertical leg of the bar in its normal upright position.

7. An adjustable curved segment for an overhead trolley system comprising, an elongated laterally flexible body member having a vertical leg, means adjacent the lower edge of the leg for supporting and aligning a trolley wire with the exposed surface of the wire arranged to be engaged by a current collector, a supporting plate attached to the body member adjacent the longitudinal center thereof, bracing means connecting the supporting plate and the ends of the body member, the ends of the bracing means and the supporting member being so arranged and constructed that when the bracing means are secured in position, a torque will be produced in the bracing means tending to counteract any tendency for the said vertical leg to twist from its upright position due to the side pull of the trolley wire.

8. A support for a trolley wire at a curve in an overhead trolley system comprising, an elongated longitudinally disposed curved bar of metal having a vertically disposed leg, a transversely disposed plate attached to the bar intermediate the ends thereof, means associated with the bar to support a continuous trolley wire with its lower surface exposed to contact with a current collector, elongated members extending from the bar on opposite sides of the plate to the plate and having their ends fixedly attached to the bar and to the plate, the members being sufficiently rigid and pre-torsioned whereby the force due to the normal side pull of the trolley wire tending to distort the said leg from the vertical will be resisted by said members, and additional torsional force required will be automatically developed in the said members and equal to the stress set up by any excess side pull of the trolley wire.

9. A support for a trolley wire at a curve in an overhead trolley system comprising, an elongated longitudinally disposed curved bar of metal having a vertically disposed leg, a transversely disposed supporting plate attached to the bar intermediate the ends thereof, means associated with the bar to connect the bar to a trolley wire, elongated tubular members extending from the bar on opposite sides of the plate to the plate and having their ends fixedly attached to the bar and to the plate and the members being sufficiently rigid and pre-torsioned whereby the force due to the normal side pull of the trolley wire tending to distort the said leg from the vertical will be resisted by said members, and additional torsional force will be automatically developed in the said members and equal to the stress set up by any excess side pull of the trolley wire.

10. A support for a trolley wire at a curve in an overhead trolley system comprising an elongated curved bar having a vertical leg and a laterally projecting leg along its upper edge, a transversely disposed supporting plate secured to the bar intermediate the ends thereof, means associated with the bar to secure the trolley wire thereto in predetermined relation to the lower edge of the bar, an elongated tubular member fixedly secured to the laterally projecting leg adjacent each end of the bar and to the plate at a point spaced from the attachment of the bar thereto, the said members being so constructed and arranged as to be sufficiently pre-torsioned to prevent a force due to the side pull of the trolley wire distorting the bar from its normal position.

11. A support for a trolley wire at a curve in an overhead trolley system comprising an elongated curved bar having a vertical leg and a laterally projecting leg along its upper edge, a transversely disposed supporting plate secured to the bar intermediate its ends, means associated with the bar to secure the trolley wire thereto in predetermined relation to the lower edge of the bar, an elongated member fixedly secured to the laterally projecting leg adjacent each end of the bar and to the plate at a point spaced from the attachment of the bar thereto, the said members being pre-torsioned sufficiently to prevent distortion of the bar from its normal position due to the side strain of the trolley wire.

12. A support for a trolley wire at a curve in an overhead trolley system comprising a longitudinally disposed flexible elongated curved bar having a vertical leg and a laterally projecting leg along its upper edge, the last said leg being tapered from the ends thereof to a point adjacent its longitudinal center for the purpose described, a transversely disposed supporting plate secured to the bar intermediate the ends thereof, means associated with the bar to secure the trolley wire thereto in predetermined relation to the lower edge of the bar, an elongated member fixedly secured to the laterally projecting leg adjacent each end of the bar and to the plate at a point spaced from the attachment of the bar thereto, the said members and the said plate and projecting leg being so constructed and arranged relative to each other that the attachment of the member ends to the plate and projecting leg will develop a torsional force in the members opposed to that due to the side pull of the trolley wire.

13. A support for a trolley wire at a curve in an overhead trolley system comprising an elongated longitudinally disposed curved bar having a vertical leg, a transversely disposed supporting plate secured to the bar intermediate its ends, means attached to the bar to secure the trolley wire thereto in predetermined relation to the lower edge of the bar, elongated members extending from the bar on opposite sides of the plate to the plate, securing means for fixedly attaching the ends of the members to the bar and plate respectively, the portion of the plate to which an end of each member is attached being so constructed and arranged that a torsional force will be developed in the members when the securing means are applied thereto and which force will be opposed to that of the trolley wire tending to distort the leg of the bar.

14. A support for a trolley wire at a curve in an overhead trolley system comprising an elongated curved bar having a vertical leg, a transversely disposed supporting plate secured to the upper edge of the bar intermediate its ends, means attached to the bar to secure the trolley wire thereto in predetermined relation to the lower edge of the bar, elongated members extending from the bar on opposite sides of the plate to the plate, securing means for fixedly attaching the ends of the members to the bar and plate respectively, means on the bar and on the plate to receive the said ends of the members, the last said means being so constructed and arranged relative to each other that when the ends of said members are fixedly attached to the bar and plate that a torsional force is set up in the members which in turn acts upon the bar to maintain the leg in a substantially vertical position against the counterforce of the trolley wire.

15. A support for a trolley wire forming part of an overhead trolley system comprising, an elongated flexible curved segment, a support for the segment secured thereto adjacent its longitudinal center, a pair of torsion rods, each rod comprising an elongated unitary member having a flattened face at each end in engagement with and secured to the upper surface of the segment at or adjacent to the ends thereof and to a surface of the support for the segment, the planes of the said flattened faces being common or parallel and the planes of the said surface of the segment support and of the said upper surface of the segment being obliquely disposed whereby a torsional stress will be set-up in each rod when secured in position tending to oppose the side pull of the trolley wire and means associated with the segment to connect the segment to the trolley wire.

16. A support for a trolley wire forming part of an overhead trolley system comprising, an elongated flexible curved segment, a support for the segment secured thereto adjacent its longitudinal center, a pair of torsion rods, each rod comprising an elongated unitary member having a flattened face at each end in engagement with and secured to the upper surface of the end portions of the segment and to a surface of the support, the planes of the said flattened faces being obliquely disposed and the planes of the said surfaces of the support for the segment and the said upper surfaces of the segment being common or parallel whereby a torsional stress will be set-up in each rod when secured in position tending to oppose the side pull of the trolley wire.

17. A support for a trolley wire forming part of an overhead trolley system comprising, an elongated flexible curved segment, a support for the segment secured thereto adjacent its longitudinal center, a pair of torsion rods, each rod comprising an elongated unitary member having a face at each end in engagement with and secured to the upper surface of the segment at or near the ends of the segment and to a surface of the support, the said faces of the rods being so constructed and arranged relative to the cooperating surfaces of the segment and the support therefor that a torque will be set-up in the rods opposing the side pull of the trolley wire to prevent the ends of the segment twisting out of their normal position due to the said side pull of the trolley wire.

18. In a support for a trolley wire comprising an elongated curved member provided with means to secure the member to the trolley wire and other means attached to the member whereby the member may be supported, the combination with said member of elongated means attached to the member at or adjacent its ends and spaced from the member intermediate the ends thereof to maintain the curvature of the member and to prevent the member twisting about its longitudinal axis due to the side pull of the trolley wire, the said elongated means being pre-torsioned to counteract the said side pull of the trolley wire.

19. In a support for a trolley wire in an overhead trolley system comprising an elongated curved member provided with means to secure the trolley wire to the member along its lower edge and also having means to support the member, the combination with said member of elongated means attached to the upper edge of the member at or adjacent its ends and spaced from the member intermediate the ends thereof to maintain the curvature of the member and to prevent it twisting about its longitudinal axis due to the side pull of the trolley wire, the last said means being pre-torsioned to counteract the side pull of the trolley wire.

20. In a support for a continuous trolley wire forming a part of a curve in an overhead trolley system comprising an elongated laterally flexible curved segment having a vertically disposed leg and provided with transversely disposed supporting and pull-off means secured to the segment intermediate its ends whereby the segment may be supported and the central portion of the leg held in a vertical position and means disposed along the segment to secure the trolley wire thereto in predetermined relation to the lower edge of the segment and to maintain the curvature of the wire against the side pull thereof, the said side pull of the trolley wire exerting a force along the lower portion of the segment tending to twist the lower edge of the end portions of the vertical leg out of vertical alignment with the upper edge and also with the central portion of the segment, the combination with the said supporting means and with the segment of a pair of elongated torsion members, each member having an end secured to the supporting means against rotation relative thereto and to the segment and having its other end secured to the upper end portion of the segment against rotation relative thereto whereby the curvature of the segment and the vertical position of the leg are maintained, the elongated members being so constructed and so arranged relative to the supporting means and to the ends of the segment that a twisting of the ends of the segment due to the side pull of the continuous trolley wire will be prevented thereby maintaining the vertical position of the said leg.

21. In a support for a continuous trolley wire comprising an elongated curved segment having a vertically disposed leg and means along the segment to secure a continuous trolley wire thereto in predetermined relation to the lower edge of the segment and having supporting means secured to the segment intermediate its ends to support the segment and maintain the central portion of the said leg in its normal vertical position, the combination with the supporting means and with the segment of elongated tension and torsion members, each member having one end non-rotatably secured to the supporting means and the other ends non-rotatably secured to the upper end portions of the segment, the said tension and torsion members being so constructed and arranged that the longitudinal pull of the trolley wire entering the segment at each end thereof will be transmitted longitudinally along the said members to the supporting means, the said tension and torsion members also being sufficiently rigid to prevent the twisting of the ends of the leg from their normal vertical position due to the side pull of the continuous trolley wire, the said side pull of the trolley wire being applied to the lower part of the segment and vertically spaced from the attachment of the tension and torsion members to the segment.

22. An overhead curve construction comprising, a continuous trolley wire, an elongated bendable segment having a normally vertically disposed leg and a predetermined degree of curvature, supporting and pull-off means attached to the segment intermediate its ends and arranged to maintain the central portion of the said leg in a vertical position, clamping means for attaching the continuous wire to the segment in predetermined relation to the lower edge of the segment and maintain the curvature of the wire against the side strains thereof, elongated torsion members having their ends non-rotatably secured to the supporting and pull-off means and non-rotatably associated with the end portions of the segment to maintain the said curvature and to transmit the longitudinal pull of the trolley wire at the ends of the segment along the longitudinal axis of the members to the supporting and pull-off means, the said torsion members being so constructed and arranged that a torsional force opposing the relative rotation of the ends of each member will develop therein due to the side pull of the continuous trolley wire thereby resisting the twisting of the end portions of the vertical leg from their vertical position relative to the central portion of the leg and to the supporting member.

23. A support for a continuous trolley conductor forming a part of a curve of an overhead trolley system comprising, an elongated curved segment having a vertically disposed leg with flexible end portions subject to twisting from their normal vertical position due to the side pull of the trolley conductor, means to secure a continuous trolley conductor to the segment and provide a continuous path of contact with a passing current collector, a supporting member for the segment secured thereto intermediate the ends thereof, means disposed on opposite sides of the support member to maintain said vertical position of the end portions of said vertical leg and to maintain the curvature of the segment, the said means comprising elongated members each having one end attached to the support member in non-rotatable relation thereto and to the segment, the other end of each elongated member being non-rotatably attached to an end portion of the segment, the elongated members being so constructed and arranged as to have sufficient rigidity to torsionally prevent a force due to the side pull of the trolley conductor distorting the end portions of the segment from their normal vertical positions, and means associated with the supporting member and cooperating with the adjacent ends of the elongated members whereby the position of the said ends of the elongated members may be altered along the supporting member and thereby change the curvature of the segment.

SAMUEL S. MATTHES.